(12) United States Patent
Hochberg et al.

(10) Patent No.: US 9,286,642 B2
(45) Date of Patent: Mar. 15, 2016

(54) CONTENT ACCESS MANAGEMENT IN A SOCIAL NETWORKING SYSTEM FOR EXTERNALLY STORED CONTENT

(75) Inventors: Lincoln W. Hochberg, Palo Alto, CA (US); Vishu Gupta, Atherton, CA (US)

(73) Assignee: Facebook, Inc., Menlo Park, CA (US)

( * ) Notice: Subject to any disclaimer, the term of this patent is extended or adjusted under 35 U.S.C. 154(b) by 273 days.

(21) Appl. No.: 13/328,987

(22) Filed: Dec. 16, 2011

(65) Prior Publication Data

US 2013/0159519 A1     Jun. 20, 2013

(51) Int. Cl.
| | |
|---|---|
| *G06F 21/00* | (2013.01) |
| *G06F 21/60* | (2013.01) |
| *G06Q 50/00* | (2012.01) |
| *G06F 21/62* | (2013.01) |

(52) U.S. Cl.
CPC .............. *G06Q 50/01* (2013.01); *G06F 21/604* (2013.01); *G06F 21/6272* (2013.01); *G06F 2221/2111* (2013.01)

(58) Field of Classification Search
CPC ...................................................... G06F 21/00
See application file for complete search history.

(56) References Cited

U.S. PATENT DOCUMENTS

| | | | |
|---|---|---|---|
| 5,673,316 A | 9/1997 | Auerbach et al. | |
| 2003/0163428 A1 | 8/2003 | Schneck et al. | |
| 2007/0124785 A1* | 5/2007 | Marsico | 725/105 |
| 2009/0254456 A1* | 10/2009 | Sarbaev et al. | 705/27 |
| 2010/0082677 A1* | 4/2010 | Athsani et al. | 707/783 |
| 2010/0229223 A1* | 9/2010 | Shepard et al. | 726/5 |
| 2011/0131190 A1 | 6/2011 | Pooley et al. | |
| 2011/0173080 A1 | 7/2011 | Kutsumi et al. | |
| 2011/0231892 A1* | 9/2011 | Tovar | 726/1 |
| 2011/0264804 A1* | 10/2011 | Vuksan et al. | 709/225 |
| 2011/0321132 A1* | 12/2011 | Slingerland et al. | 726/4 |
| 2012/0149325 A1 | 6/2012 | Titus et al. | |
| 2013/0091214 A1 | 4/2013 | Kellerman et al. | |

* cited by examiner

*Primary Examiner* — Suraj Joshi
(74) *Attorney, Agent, or Firm* — Fenwick & West LLP

(57) ABSTRACT

A content access management system receives an access determination requested identifying an access rule and a requesting user. The access rule may be created in advance by the content owner at the content access management system. The access rule may allow access to content objects based on the requesting user's biographic information, geographic information, affiliation information, payment information, or any other user characteristic. The user information may be entered by the requesting user at a social networking system interface for purposes unrelated to the content object or content owner. The content access management system retrieves the identified access rule and retrieves requesting user information based on the access rule. An access determination is made based on the retrieved access rule and requesting user information, and is transmitted to the content owner.

21 Claims, 7 Drawing Sheets

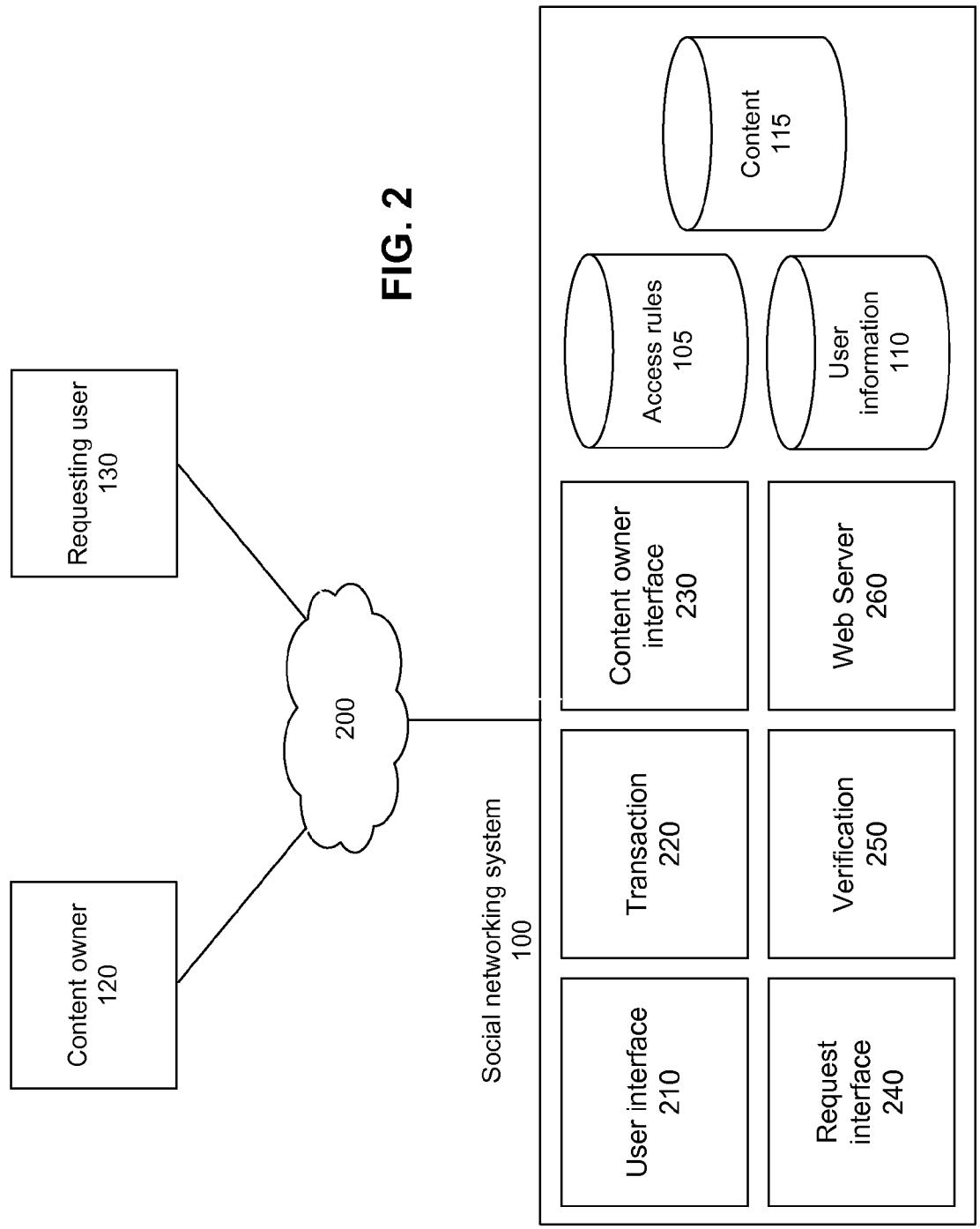

CONTENT ACCESS MANAGEMENT IN A SOCIAL NETWORKING SYSTEM FOR EXTERNALLY STORED CONTENT

BACKGROUND

This invention relates generally to social networking, and in particular to providing a content access management system for external content owners by a social networking system.

Content owners on the internet often limit the audience for their content to individuals who satisfy pre-determined criteria. Examples of such audience restrictions include individuals above a certain age, individuals within a particular geographic area, and individuals who have paid for access to content (for instance, via content subscriptions). In order to access such content, individuals must provide credentials proving that the pre-determined criteria are satisfied. For instance, an individual might verify his age using an online form, an individual's location might be determined through the individual's IP address, and an individual might prove that he has paid for access to content using a password provided by the content owner.

Content for the purposes described herein includes, but is not limited to, text (such as articles, magazines, news, and books), media (such as video and audio), images, documents and other data, and games. For example, a user may request access to a movie that requires the user to be a certain age, or may attempt to read a journal article that requires purchasing the article. In addition, content owners may restrict access to content portals, such as streaming video or music services, content websites, communications portals (such as VoiP services and message boards), online game services or any other content venue behind content paywalls, which require a user to pay for access to the content portal. For example, a user may attempt to stream a movie from a streaming video service with internet access that requires membership with the service, or may attempt to video call a friend through a VoiP service that requires pre-paid video call minutes. Likewise, a user might attempt to play a game through an online game service that requires proof of a subscription to the game service.

The management of a user's personal and financial verification information is accompanied a host of privacy issues. Encryption and other web and data security measures are used to protect verification information, but these measures can be expensive for content owners to maintain. Further, the pre-determined access criteria set by content owners can vary by content item and type, complicating access management. Finally, the access criteria established by one content owner is inflexible in application to the content of another content owner, requiring each content owner to separately establish and maintain access criteria and security measures, resulting in inefficient and non-overlapping verification systems between content owners.

SUMMARY

A content access management system makes an access determination in response to the receipt of an access determination request from a content owner. The content access management system may be implemented in a social networking system. User information is received, such as social information, biographic information, geographic information, payment information, or affiliation information. The user information may be received at a social networking system interface, and it may be received for purposes unrelated to content access. For instance, the user information may be received from a user in the process of filling out a user profile page on the social networking system or when connecting to and interacting with other users within the social networking system. The user information may also include actions taken within the context of the social networking system, or actions taken external to the social networking system but tracked through the social networking system using, for example, a social networking system plug-in or API.

A requesting user requests access to a content object stored by the content owner. The content owner may have previously created an access rule at the content access management system for the requested content object. The content access management system may provide an interface for the content owner to create an access rule, and may provide sample access rules created by other content owners. The content owner interface may allow any number of content owners to create access rules for content objects, and all the created access rules may be stored in an access rule database. It should be noted that the content owner may be any entity hosting a content object, or with ownership rights to content. For instance, a streaming media service, a media store, a file hosting service, a digital locker, and the like qualify as content owners. Once an access rule is created, the content access management system may generate an identifier for the access rule, and may transmit the identifier to the content owner for subsequent access rule identification.

In response to receiving a request for a content object from the requesting user, the content owner makes an access determination request from the content access management system in order to determine whether the requesting user can access the requested content. The access determination request may identify the access rule associated with the requested content object, and may identify the requesting user. In response, the content access management system retrieves the identified rule, and retrieves user information associated with the requesting user. The retrieved user information may be specified by the retrieved rule, and may be a subset of the total stored user information associated with the requesting user. User information may be retrieved from a local storage module (such as a social networking system social graph), or may be retrieved from an external source. An access determination is made based on the retrieved access rule and the retrieved user information associated with the requesting user, and the access determination is transmitted to content owner. Alternatively, an access determination token may be transmitted to the content owner, or to the requesting user, indicating that the requesting user can access the requested content.

The access rule may limit access to content based on access criteria that must be satisfied by the retrieved user information. Likewise, the access rule may limit access to content based on denial criteria that, if satisfied by the requesting user, prohibit the requesting user from accessing the requested content object. The access rule may limit access to content based on particular biographic information, geographic information, affiliation information, payment information, action or interaction information, or any other information associated with the requesting user.

The access rule may limit access to content based on, e.g., the age of the requesting user, the requesting user's current or previous place of employment or school, the requesting user's current or previous geographic location or place lived, or a current or previous location or event checked into by the requesting user. The access rule may also limit access to content based on the requesting user's relationship status, gender, philosophy, political views, religious views, favorite movie, favorite book, favorite music group, favorite television show, favorite game, or any other biographic or geographic criteria.

In another example, the access rule may limit access to content based on membership in a social networking system group, based on a subscription to a fan page, based on following a particular social networking system user, based on a connection with a particular social networking system user, or based on a connection with a social networking system user who satisfies an additional access criteria. The access rule may also limit access to content based on an affiliation with any entity, such as a non-person entity, or based on any other affiliation within or external to a social networking system.

In another example, the access rule may limit access to content based on actions taken within a social networking system. For example, the access rule may limit access to users who have shared, endorsed, recommended, played, tagged, RSVP'd to, or otherwise interacted with an identified social networking system object. The identified object may be a media object, such as a movie, song, or image; may be a game; may be an advertisement; may be a survey or question; or may be an event. The access rule may also identify an action taken by a requesting user that originates within a social networking system, but completed outside the social networking system (for instance, the selection of an ad within the social networking system and the completion of a purchase outside the social networking system).

In another example, the access rule may limit access to content based on access fees paid by the requesting user. For example, the access rule may limit access to content based on a subscription fee paid by the requesting user, based on a one-time access fee paid by the requesting user, based on a content purchase by the requesting user, or based on any other access fees. The access rule may limit access to content based on a combination of factors described herein. For instance, access may be limited based on a requesting user's age and location.

The content owner, in response to receiving an access determination from the content access management system indicating that the requesting user can access the requested content object, may grant the requesting user access to the requested content object. Likewise, if the access determination indicates that the requesting user cannot access the requested content object, the content owner may deny the requesting user access to the requested content object. The content owner may indicate to the requesting user why the requested access was denied, and may prompt the content owner to take an action in order to access the requested content object.

In one alternative embodiment, content owners transmit content objects to the content access management system for storage. In this embodiment, users request access to content objects directly from the content access management system. The content owners create access rules for the uploaded content objects, and the content access management system stores these rules. In response to a user requesting a stored content object, the content access management system retrieves the access rule associated with the requested content object, retrieves information associated with the requesting user, and makes an access determination based on the retrieved access rule and the retrieved user information. Responsive to a determination that the requesting user can access the requested content object, the content access management system provides the requesting user with access to the requested content object.

BRIEF DESCRIPTION OF THE DRAWINGS

FIG. 2 is a high level block diagram of a system environment suitable for implementing a content access management system in a social networking system, according to one embodiment.

Figure 1A:
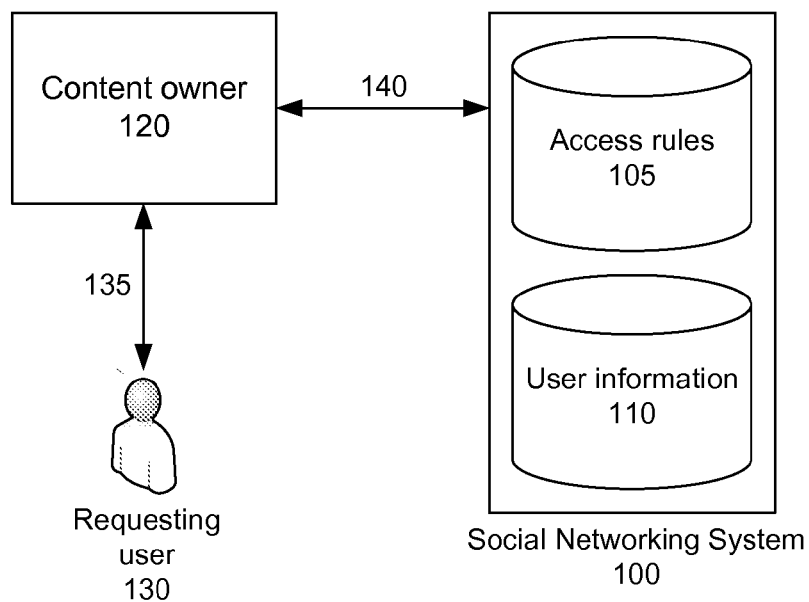
FIG. 1a is a diagram illustrating interactions between a requesting user, a content owner, and a content access management system implemented in a social networking system, according to a first embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system may include a web-based interface comprising a series of inter-connected pages displaying and allowing users to interact with social networking system objects and other users. For example, a social networking system may display a page for each social networking system user including objects and information entered by or related to the social networking system user (the user's "profile"). Social networking systems may also contain pages containing pictures or videos, dedicated to concepts, dedicated to users with similar interests ("groups"), or containing communications or social networking system activity to, from or by other users.

Social networking system pages may contain links to other social networking system pages, and may include additional capabilities such as search, real-time communication, content-item uploading, purchasing, advertising, and any other web-based technology or ability. It should be noted that a social networking system interface may be accessible from a web browser or a non-web browser application, such as a dedicated social networking system mobile device or computer application. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

Social networking system information that is tracked and maintained by a social networking system may be stored as a social graph, which includes a plurality of nodes that are interconnected by a plurality of edges (representing interactions, connections, communications or other measures of relatedness between nodes). A social graph node may represent a social networking system object that can act on and/or be acted upon by another node. An edge between nodes in a social graph represents any kind of connection or interaction between the two nodes, which may result from an action that was performed by one of the nodes on the other node. In this description, reference to an edge connecting two objects in a social graph is intended to refer to an edge connecting the nodes representing each of the two objects.

A social networking system object may be a social networking system user, non-person entity, content item, group, social networking system page, location, application, time or date, concept or other social networking system object, such as a movie, a band, or a book. Content items may be anything that a social networking system user or other object may create, upload, edit or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Each social networking system object may be represented by a distinct social networking system node in a social graph.

Online social networking systems allow users to associate themselves, establish connections with and interact with other users of the social networking system. When two users establish a connection, they become "friends" (or, "connected") within the context of the social networking system. Being friends in a social networking system may allow users access to more information about each other than would otherwise be available to unconnected users. For instance, being friends may allow a user to view a profile page of another user, to see another user's friends, or to view actions taken within the social networking system by another user. In addition, being friends may allow a user greater access to interact with another user. For instance, being friends in the context of a social networking system may allow a user greater access to communicate with another user, to communicate about another user, to share objects and other information with another user, to comment on objects associated with another user, to endorse objects associated with another user, and so forth. Each association, established connection and interaction between two users is represented in the social graph by an edge connecting the users.

A social networking system may allow a user to establish a variety of types of connections with another user. For example, users may establish various personal relationships with another user in a social networking system, such as a friendship, a romantic relationship (such as dating, engagement, or marriage), or a familial relationship (such as parent/child, grandparent/grandchild, aunt/uncle/niece/nephew, or cousin). In addition, users may establish non-personal relationships, such as employee/employer/co-worker or student/teacher/classmate. A social networking system may also allow a user to establish details of relationships, such as anniversaries or other relationship milestones. Each type of established connection may be represented by an edge in the social graph, and more than one edge may connect two users with an established relationship. For example, if two users are cousins and co-workers, a first edge may connect the users for establishing a connection in the social networking system, a second edge may connect the users for indicating that they are cousins, and a third edge may connect the users for indicating that they are co-workers.

A social networking system may allow users to communicate both within and external to the social networking system. For example, within a social networking system, a first user may send a second user a message, an email, an instant message, a voice call, and a video chat call. Communications may originate from within the social networking system but be transmitted external to the social networking system, for example, an email sent from within the social networking system but sent to the personal email account of another. Communications may also originate external to the social networking system but be transmitted within the social networking system, for example, an instant message sent from instant messaging software and transmitted to an internal social networking system instant messaging interface. Further, a first user may comment on the profile page of a second user, or may comment on content items associated with a second user, such as content items uploaded by the second user. In addition, a user may communicate about another user by tagging the user in a message or content item. A user may also communicate without directing the communication at a particular other user by, for example, posting a status or message to the user's profile. Each communication may be represented by a node in the social graph, and an edge may connect the communicating users to each other and to the communication's node.

A social networking system may allow a user to upload pictures, videos, documents, songs, or any other object. A social networking system may also allow a user to create events, RSVP to events, endorse objects, recommend objects, and tag others in objects. A node representing an object may be connected to the node representing an uploading user, a tagging user, a tagged user, a creating user, an endorsing user, a recommending user, or a recommended user for the object.

A social networking system may allow a user to enter and display information related to the user's interests, education and work experience, contact information, age, religious beliefs, political beliefs, and other biographic information in the user's profile page. Each school, employer, interest (for example, music, books, movies, television shows, games, political views, philosophy, religion, groups, or fan pages), geographical location, network, or any other information contained in a profile page may be represented by an object in the social graph. Further, an edge may connect a user with any object representing information in the user's profile page. For example, if in a profile page a user indicates attendance at "the University of Idaho," lists "Anchorman" as a favorite movie, and lists "Post Falls, Idaho" as a hometown, the user may be connected by an edge to objects representing the University of Idaho, Anchorman, and Post Falls, Id.

A social networking system may allow a user to access content such as media and games within the social networking system. Edges connect the nodes representing each media item and game played with the node representing the user playing the media item or game. Additional nodes may represent milestones within media items and games. For example, if a user views a particular scene in a movie, an edge may connect the user's node with a node representing the scene in the movie. Likewise, if a user completes a particular level in a game, performs an in-game action, obtains a particular in-game item, or achieves a particular score, an edge may connect the user's node with nodes representing such milestones. In addition, a social networking system may allow users to share media and game milestones from media and games played outside the context of the social networking system using, for example, a social networking system plug-in. In such embodiments, an edge connects the user to nodes representing the external media and game milestones.

A social networking system may allow a user to check into locations using location-detection functionality implemented with, for example, a GPS receiver implemented in a mobile device. Location-detection functionality may allow a mobile device to identify the mobile device's presence at a location or event entity, such as a restaurant or other place of business, a concert or other event, a park, a race, a city, or any other identifiable location or occurrence. If a user checks into a location or event, an edge may connect the user's node to a node representing the location or event in the social graph.

Figure 1B:
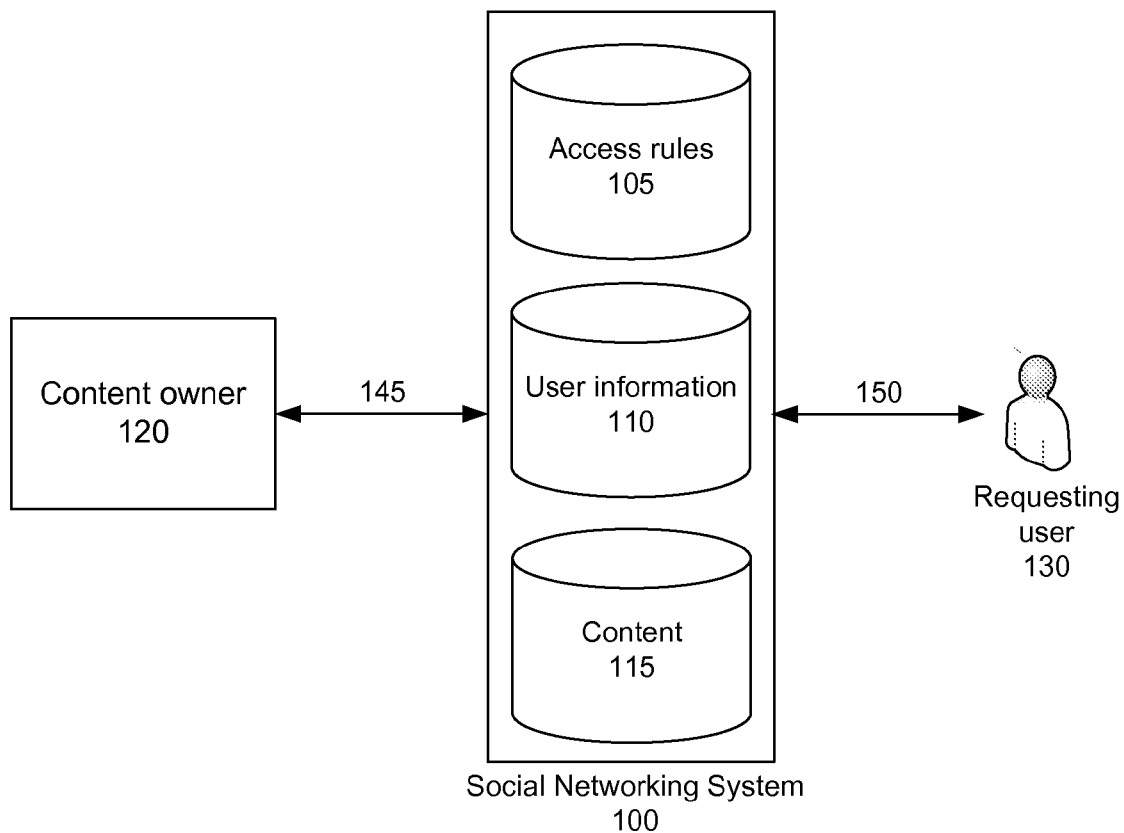
FIG. 1b is a diagram illustrating interactions between a requesting user, a content owner, and a content access management system implemented in a social networking system, according to a second embodiment.

FIGS. 1a and 1b are diagrams illustrating interactions between a requesting user, a content owner, and a content access management system implemented in a social networking system, according to various embodiments. In FIG. 1a, a social networking system 100 includes an access rules storage module 105 and a user information storage module 110. The access rules storage module 105 includes rules created by a content owner 120 to regulate access to content owned by the content owner 120. The user information storage module 110 stores information about a requesting user 130 who requests content from the content owner 120.

The content owner 120 creates a rule for a content object in the social networking system 100. In response to receiving a request 130 for the content object from the requesting user 130, the content owner 120 identifies the requesting user 130 and the rule associated with the content object stored at the social networking system 100 in the access rules storage module 105. The content owner 120 transmits 140 the identities of the rule and the requesting user 130 to the social networking system 100. The social networking system 100 retrieves the identified rule stored in the access rules storage module 105, and determines whether the requesting user 130 can access the content based on the retrieved rule and information associated with the requesting user 130 stored in the user information storage module 110. The user access determination is transmitted 140 to the content owner 120, and the content owner 120 provides 135 the requesting user 130 access to content object based on the received access determination. The embodiment of FIG. 1a thus beneficially allows content owners to store, maintain, and regulate access to their own content objects, while relying on the content access management capabilities of the social networking system 100.

In the embodiment of FIG. 1b, the social networking system additionally includes a content storage module 115. The content owner transmits a content object to the social networking system 100 and creates an access rule for the transmitted object at the social networking system 100. The social networking system stores the received content object at the content storage module 115, and stores the created access rule in the access rule storage module 105.

In this embodiment, the requesting user 130 requests 150 the content object directly from the social networking system 100. In response to receiving the request from the requesting user 130, the social networking system 100 identifies the requesting user 130 and retrieves the access rule associated with the requested content object. The social networking system 100 retrieves user information associated with the requesting user 130 from the user information storage module 100, and determines whether the requesting user 130 can access the requested content object based on the retrieved user information and the retrieved access rule. The social networking system 100 then provides 150 the requesting user 130 access to the requested content object based on the access determination.

It should be noted that although the content access management system described herein is described in the content of a social networking system, the principles described herein are equally applicable to content access management systems implemented outside the context of a social networking system.

System Architecture

FIG. 2 is a high level block diagram of a system environment suitable for implementing a content access management system in a social networking system, according to one embodiment. The system environment includes a content owner 120, a requesting user 130, and a social networking system 100 that communicate through a connecting networking 200. Although only one content owner 120 and one requesting user 130 are shown in FIG. 2, any number of content owners and requesting users may communicate with the social networking system 100, for example thousands or millions.

The connecting network may be the Internet, a local area network, a wireless network, a cellular network, or any other network that allows communication between modules. The connecting network 200 may use standard communications technologies and/or protocols. In alternative configurations, different and/or additional modules can be included in the system. In addition, the connecting network 200 may include a combination of networks. For example, in the embodiment where a requesting user 130 communicates with a mobile phone, the connecting network 200 may include a cellular phone wireless network which interfaces with the Internet, allowing the mobile phone to connect with a social networking system's web servers.

The content owner 120 is an entity that hosts or owns content. As used herein, "content" refers to media content, such as movies and music, games, images, documents, information or data, or any other form of digital content. Further, although reference is made to the "content owner", the content owner 120 entity may not necessarily "own" the content in the strictest sense, but may instead have rights to control access to content owner by other entities. The content owner 120 is implemented in and communicates using a computer, such as a server, a database, or any other device capable of serving content and of communicating with the requesting user 130 and the social networking system 100. The content owner 120 may include a portal for serving content, such as a web page or streaming content service. The content owner 120 may also include means for identifying a requesting user 130, such as a dedicated user login system, a social networking system plug-in, an identity request system, an identity verification system, or any other suitable means for identifying the requesting user 130.

The requesting user 130 may communicate using any type of device capable of sending or receiving communications to and from the content owner 120 and the social networking system 100, such as a mobile phone, a laptop, a netbook, a tablet, a desktop computer, a server, a database, or a television. The requesting user 130 interacts with the content owner 120 and/or the social networking system 100 via an application, such as a web browser or a native application. The requesting user 130 may use the application to perform social networking system operations such as requesting and browsing content from the social networking system 100, communicating and establishing connections with other users, uploading pictures and other content items to the social networking system 100, providing an identity to the social networking system 100, and performing any other social networking system actions. Likewise, the requesting user 130 may use the application to navigate a web page or service of the content owner 130, to request content from the content owner 130, to provide an identity to the content owner 130, and to receive content from the content owner 130.

The social networking system 100 as illustrated includes a user interface 210, a transaction module 220, a content owner interface 230, a request interface 240, a verification module 250, and a web server 260. In addition, the social networking system 100 includes the access rules storage module 105, the user information storage module 110, and the content storage module 115. In alternative embodiments, the social networking system 100 includes fewer, additional, or different components than are illustrated in FIG. 2. For example, the access rules storage module 105, the user information storage module 110, and the content storage module 115 may be implemented in the same storage module.

The pages of the social networking system 100 may be hosted on the web server 260. These pages may include information retrieved from one or more social networking system databases, such as the user information storage module 110, the content storage module 115, or any other social networking system database not shown in FIG. 2. The web server 260 additionally manages receiving and transmitting all communications to and from the social networking system 100 through the connecting network 200. Other components required to operate a website, a data center, a data service and the like may additionally be included within the social networking system 100, but are also not illustrated in FIG. 2, for the purposes of simplicity.

The user interface 210 allows users of the social networking system 100 to interact with the social networking system 100. The user interface 210 may include a graphic user interface that allows users to navigate the pages of the social networking system using, for instance, a web browser or a native application. The user interface 210 may include forms for a user to enter biographic information, such as the user's age, location, employment history, education history, or any other information related to the user. Users may use the user interface 210 to connect or communicate with other users, to upload content items or other objects, to create events, to check in to locations, to endorse or recommend objects to other users, to tag other users, or to perform any other social networking system function, such as those described above. User biographic, geographic, communicative, interactive and other information stored as part of a social graph is stored in the user information storage module 110.

The transaction module 220 allows users to enter financial payment information, such as credit card information or bank account information, within the social networking system 100, which is then stored in the user information storage module 110. Payment information may be entered directly through the social networking system 100 via the user interface 210, or may be entered through the content owner 120 using, for example, a social networking system 100 plug-in that sends the payment information to the social networking system 100 for storage in the user information storage module 110. Either the content owner 130 or the social networking system 100 may charge an access fee to the payment information of the user in response to a request for access to content which requires payment by the user. In one embodiment, the transaction module 220 allows users to subscribe to the content of a content owner 130 through the social networking system 100. For example, a user may enter credit card information to the social networking system 100 via the transaction module 220, the social networking system 100 may charge a subscription fee to the user's credit card, and the social networking system 100 may pay the subscription fee to the content owner 130. Alternatively, the social networking system 100 may provide the user's payment information directly to the content owner 130, and the content owner 130 may charge the user a subscription fee. In addition to subscription fees, either the content owner 130 or the social networking system 100 may charge a one-time access fee for content, or may charge any type of fee associated with accessing content.

In one embodiment, a user may enter payment information via the transaction module 220 in advance of requesting content. In such an embodiment, a user that has previously entered payment information via the transaction module 220 can avoid having to re-enter payment information when the user wishes to pay for access to content. Instead, in response to requesting access to content that requires payment, the content owner 130 or the social networking system 100 may prompt the user to pay using stored payment information. In the event that the requesting user 130 requests access to content requiring payment without previously providing payment information, the transaction module 220 may prompt the requesting user 130 to provide payment information.

The content owner interface 230 allows content owners to create content access rules for storage in access rules storage module 105. In one embodiment, a content owner 120 creates a rule for regulating access to a particular content object, and the content owner interface 230 creates a unique identifier for the rule and sends the rule identifier to the content owner 120 for storage. In such an embodiment, the rule identifier is subsequently used by the content owner 120 to identify the created rule to the social networking system 100 when a requesting user 130 requests access to the content object associated with the rule from the content owner 120. Allowing the social networking system 100 to store and manage access rules allows the social networking system 100 to uniformly format and apply access rules. Further, in this embodiment, the content owner 120 does not transfer the content objects associated with created access rules to the social networking system 100, reducing the bandwidth and storage capacity required by the social networking system 100, and maximizing the control content owners 130 have over their content. Instead of creating unique access rule identifiers, the content owner interface 230 may create unique content object identifiers for the content objects associated with the created access rules, and may send the content object identifiers to the content owner 120 for storage.

In an alternative embodiment, content owners 120 upload content objects to the social networking system 100, and the social networking system 100 stores received content objects in the content storage module 115. In this embodiment, content owners 120 create access rules that are stored in the access rules storage module 105 using the content owner interface 230 for content uploaded to the social networking system 100. The social networking system 100 may create a unique identifier for each rule, and may associate the identifier with the stored content associated with the rule. Subsequently, when a requesting user 130 requests a content object stored by the social networking system 100, the social networking system retrieves the access rule associated with the content, for example using a unique access rule identifier associated with the requested content object, to determine if the requesting user 130 can access the requested content.

In one embodiment, a first set of content owners 120 may upload content to the social networking system 100 for storage, while a second set of content owners 120 store and maintain content themselves. In such an embodiment, a requesting user 130 must request access to content stored by the social networking system 100 from the social networking system 100, and must request access to content stored by the second set of content owner 120 directly from the second set of content owners 120. For both sets of content owners, the social networking system 100 stores access rules created by the content owners 120.

Content access rules created by the content owner 120 identify access information required to make an access determination for a requesting user 130. For instance, a content access rule may require a requesting user 130 to be older than a certain age; in such an instance, the content access rule identifies the requesting user's age as access information required to make an access determination. Likewise, a content access rule may require a requesting user 130 to have paid for access to a content object; in such an instance, the content access rule identifies the requesting user's payment information as access information required to make an access determination. Content access rules may identify any information or combination of information related to the requesting user 130 as required access information.

The access rules created by the content owner 120 may inclusively restrict access to content objects to users who satisfy pre-determined criteria. The criteria may include biographic criteria. For example, a user may be required to be a certain age in order to access content, to have attended a particular school, to work at a particular place of employment, and the like. The access rules created by the content owner 120 may limit access to users based on any biographic information. The criteria may include geographic criteria. For instance, access may be restricted to users who live in a particular geographic region. Access may be restricted based on any biographic or geographic criteria, such as place of employment (present or past), school (present or past), place lived (present or past), relationship status, anniversary, age, birthday, gender, philosophy, political view, religious views, favorite movies, favorite books, favorite music/music acts, favorite TV shows, favorite games, or any other interests. In one embodiment, access may be restricted based on any information stored or discoverable by a social networking system 100, for instance in the user information storage module 110.

Access rules may restrict access to content based on membership or affiliation in particular social networking system groups or networks. For instance, access to content may be restricted based on whether a user is a member of the "UC Davis" network, the "Filipino American" network, or the "Boy Scouts of America" network. Likewise, access to content may be restricted based on whether a user has joined the "Sony Playstation 3" group, has subscribed to the "Barack Obama" fan page, or has followed "Eddie Van Halen" within the context of the social networking system. An access rule may also restrict access to content based on association with other social networking system users. For instance, access may be restricted to friends or relatives of User A, friends of friends of User B, or friends of users who satisfy an access criteria (such as friends of users who have attended Gonzaga University). Access may be restricted based on any association with a group, a fan page, a celebrity or other individual, an entity, or another social networking system user.

Access rules may restrict access to content based on actions taken by a requesting user 130. In one embodiment, access to content is restricted based on actions taken with the social networking system 100. For example, access may be restricted to users who have signed up for a newsletter, who have endorsed an object (for instance, by "liking" the object), who have shared an object, or who have recommended an object. Likewise, access may be restricted to users who have played a particular game, completed a particular achievement within the game, or completed the game. Access may also be restricted to users who have watched a particular video, watched or viewed an ad, interacted with an ad, taken a survey, or answered a question. Access may be restricted to users based on actions that originated within the social networking system 100 but were completed outside the social networking system 100. For example, access may be restricted to users who both click an ad displayed within the social networking system 100 that directs the users to an external page, and complete a purchase on the external page. Access may be restricted to users based on the current geographic location of a user's mobile device with location-detection capabilities, or based on locations or events checked in to by a user. Access may also be restricted to users that have tagged other users in an object, that have been tagged by other users in an object, that have uploaded images or other objects, that have created documents or other objects, or that have planned or RSVP'd to events. Access to content may be restricted to any action taken within the context of or external to a social networking system.

Access rules may restrict access to content based on access fees paid by a requesting user 130. The access fees may include recurring subscription fees, one-time subscription fees, one-time access fees for access to one or more content object, access fees for access to access to content portals, or any other type of access fees. As described above, user payment information may be stored by the social networking system 100 in the user information storage module 110. A content owner 120 may restrict access to a content object to users that have paid for access to the content object, and may determine the type of payment required for access to the content object.

Access rules may restrict access to content based on a requesting user's preferences or settings. For example, a requesting user 130 may indicate in user settings or preferences a desire to block content or access to content based on content type, the source of the content, fees associated with the content, and so forth. Similarly, a requesting user 130 may indicate in settings or preferences a desire to access content by type, source, fees, or any other criteria. Access rules may restrict access to content for users with such user settings or preferences if the requested content qualifies as content prohibited by the settings or preferences.

Access rules may restrict access to content based on a third party's preferences or settings. For example, a parent or guardian may include parental settings that restrict a requesting user's (such as a minor) access to content based on content type, content subject matter, content source, recommended viewing age, or any other content-related information. Similarly, an account administrator or group administrator may restrict access to content in administrator settings based on content type, subject matter, source, and the like. Access rules may restrict access to content for users subject to such parental or administrator settings if the requested content qualifies as content prohibited by the settings.

Access rules may restrict access to content based on a combination of the access criteria described herein. For instance, access to a content object may be restricted to users over 21 years of age who live in Idaho. Likewise, access to a content object may be restricted based on different criteria for different users. For example, access to a content object may be restricted to users over 21 years of age who live in Idaho, and to users over 18 years of age who live in Nevada.

Access rules may restrict access to content based on the content object, based on the content object type, or based on any other criteria. In one embodiment, a content owner 120 may create an access rule for each content object stored by the content owner 120 or the social networking system 100. A content owner 120 may re-use access rules previously created by the content owner 120 or by other content owners for content objects. In one embodiment, a content owner 120 may create an access rule for each content object type. For example, a content owner 120 may create a first access rule for videos, a second access rule for news articles, and so forth. A content owner 120 may also create a universal access rule for all content stored by the content owner 120 or by the social networking system 100. For example, a content owner 120 may restrict access for all hosted content to users over the age of 18.

The access rules created by the content owner 120 may also exclusively restrict access to content objects to users who satisfy pre-determined criteria. In other words, for each of the access rule criteria described herein, the same criteria may be used to define which users may not access content. For example, an access rule may restrict access to a content object to a user who has not previously worked for a particular company, who has not joined a particular social networking system group, or who has not previously paid an access fee for the content. It should be noted that exclusionary access rules may be created as the inverse of an inclusionary access rule. For example, the rule "users over 21 years of age may view this content" and the rule "users under 21 years of age may not view this content" result in the same set of users able to view the content.

The content owner interface 230 may be a graphic interface accessible to pre-determined content owners, or to all users of a social networking system. The content owner interface 230 may allow a content owner 120 to select from pre-determined access rules for a content object. The pre-determined access rules may include the most popular access rules, or may include rules that vary by content object type or by the identity of each content owner 120. Each of a plurality of content owners 120 may use the content owner interface 230 to create rules for one or more content objects, creating a plurality of access rules to be stored in the access rules storage module 105.

It should be emphasized that although access restriction is described within the context of a social networking system, these restriction criteria apply equally to entities external of a social networking system but that communicate the actions to the social networking system (using, for example, a social networking system plug-in), or to entities independent of a social networking system. For example, in the embodiment where the content access management system described herein is implemented in a management entity other than a social networking system, the access rules described herein may restrict access to content based on user biographic and geographic information, association with a group or other entity, actions taken by a user, user payment information, or any other criteria tracked and maintained by the management entity.

The request interface 240 is configured to receive requests for content access determinations from content owners 120. The requesting user 130 may request access to a content object stored by the content owner 120, and in response, the content owner 120 requests an access determination for the requesting user 120 for the requested content object. In one embodiment, the content owner 120 identifies the requesting user 130 and the rule associated with the requested content object to the request interface 240. Alternatively, the content owner 120 may identify the requesting user 130 and the requested content object to the request interface 240.

The request interface 240 is also configured to receive requests for content from requesting users 130. The requesting user 130 may request access to a content object stored by the social networking system 100, and in response, the social networking system 100 may identify an access rule associated with the requested content from the access rules storage module 105. The request by the requesting user 130 includes the identity of the requested content, and may include the identity of the access rule associated with the requested content. The request from the requesting user 130 additionally includes the identity of the requesting user 130.

The verification module 250 is configured to determine whether a requesting user 130 may access a requested content object. In response to the request interface 240 receiving a request for a content access determination from a content owner 120 or a request for access to content from a requesting user 130, the verification module 250 retrieves an access rule associated with the request from the access rules storage module 105. In one embodiment, the request received at the request interface 240 includes an access rule identifier associated with the requested content object. In such an embodiment, the verification module 250 retrieves the identified access rule from the access rules storage module 105. In one embodiment, the request received at the request interface 240 includes a content object identifier associated with the requested content object. In such an embodiment, an access rule associated with the identified content object is identified by the verification module 250 and retrieved from the access rules storage module 105.

After retrieving an access rule from the access rules storage module 105, the verification module 250 retrieves the information identified by the retrieved access rule as required to make an access determination for the identified requesting user. As described herein, this required access information may include biographic or geographic information associated with the requesting user 130, affiliation or interaction information associated the requesting user 130, payment information associated with the requesting user 130, or any other information associated with the requesting user 130 that is required by the verification module 250 in order to make a content access determination.

In one embodiment, the information identified by the retrieved access rule as required to make an access determination is stored in the user information storage module. In this embodiment, the requesting user 130 may have previously provided the identified information to the social networking system 100 via the user interface 210 for the purposes of accessing the content of the content owner 120. Alternatively, the requesting user 130 may have previously provided the identified information to the social networking system 100 via the user interface 210 for purposes unrelated to or independent of the requested content object or the content owner 120 specifically. For example, a requesting user 130 may have previously provided the identified information in order to access content from another content owner 120. The requesting user 130 may have previously provided the identified information to the social networking system 100 for purposes unrelated to or independent of content access generally. For example, a requesting user 130 may have previously provided the identified information to the social networking system 100 during the course of utilizing a social networking system functionality unrelated to content access, such as filling out a user profile.

The verification module 250 makes an access determination based on the retrieved identified information for the requesting user 130 and the retrieved rule associated with the requested content. If the identified information for the requesting user 130 satisfies the access criteria of the retrieved rule, the verification module 250 determines that the requesting user 130 may access the requested content. Alternatively, if the identified information for the requesting user 130 does not satisfy the access criteria of the retrieved rule, the verification module 250 determines that the requesting user 130 may not access the requested content. In one embodiment, if the identified information for the requesting user 130 is not readily attainable from (for instance) the user information storage module 110 or elsewhere, the verification module 250 may determine that a determination cannot be made until the required information is obtained, or user information may be retrieved from an external source for verification purposes.

In the event that the content owner 120 requests a content access determination and the verification module 250 determines that the requesting user 130 may access the requested content, the verification module 250 provides the access determination to the content owner 120, and the content owner 120 may then provide access to the requested content to the requesting user 130. In the event that a requesting user 130 directly requests access to content from the social networking system 100 and the verification module 250 determines that the requesting user 130 may access the requested content, the social networking system 100 provides the requesting user 130 with access to the requested content.

In the event that the content owner 120 requests a content access determination and the verification module 250 determines that the requesting user 130 may not access the requested content, the verification module 250 similarly provides the access determination to the content owner 120, and the content owner 120 may then deny access to the requested content to the requesting user 130. In the event that a requesting user 130 directly requests access to content from the social networking system 100 and the verification module 250 determines that the requesting user 130 may not access the requested content, the social networking system 100 denies access to the requested content to the requesting user 130.

In response to a determination that a requesting user 130 may not access requested content, the verification module 250 may indicate the reason for the denial of access to the content owner 120 or the requesting user 130. The content owner 120, in response to receiving such an indication, may provide the indication to the requesting user 130. In one embodiment, indicating the reason for an access denial includes identifying the pre-determined access criteria associated with the retrieved access rule. For example, if an access rule requires users to be 21 years of age or older in order to access a content object associated with the access rule, the verification module may indicate the age requirement to the content owner 120 or the requesting user 130. Likewise, indicating the reason for an access denial may include identifying the user information that failed to satisfy the access criteria associated with the access rule.

In addition, in response to a determination that a requesting user 130 may not access requested content, the verification module 250 may prompt the content owner 120 to in turn prompt the requesting user 130, or may directly prompt the requesting user 130, to provide information or otherwise take an action that satisfies the access criteria of the retrieved access rule. For example, the verification module 250 may prompt for the payment of a fee or for other payment information, and the content owner 120 or the social networking system 100 may display the prompt to the requesting user 130. In this example, if the requesting user 130 provides the payment of the fee or payment information, access to the requested content may be granted to the requesting user 130. In other embodiments, the requesting user 130 may be prompted to provide addition information or to take a particular action in order to access the requested content. Similarly, if additional information is required in order for the verification module 250 to make an access determination, the verification module 250 may prompt the requesting user 130 (either through the content owner 120 or directly) for the additional information.

In the event that the requesting user 130 is prompted to purchase access to the requested content, to provide additional information, to take an action, or to satisfy any other access criteria, and the requesting user 130 refuses or fails to do so, the verification module 250 denies access to the requested content to the requesting user 130. Alternatively, instead of prompting the requesting user 130 for additional information, for payment, to perform a particular action, or to satisfy any other criteria, the verification module 250 may simply determine that the requesting user 130 may not access the requested content.

Operation

Figure 3A:
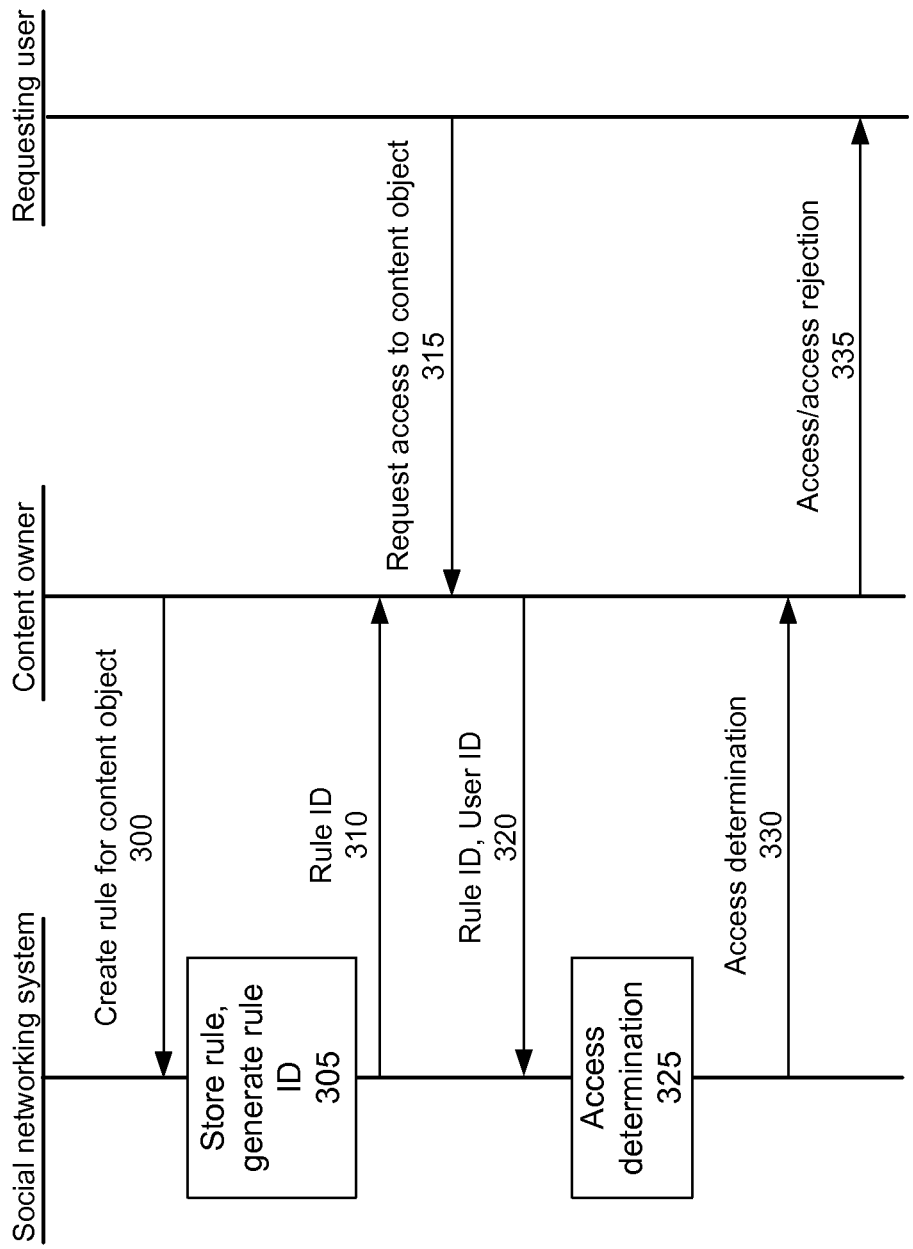
FIG. 3a is an example timing diagram illustrating interactions between a requesting user, a content owner, and a content access management system implemented in a social networking system, according to a first embodiment.
Figure 3B:
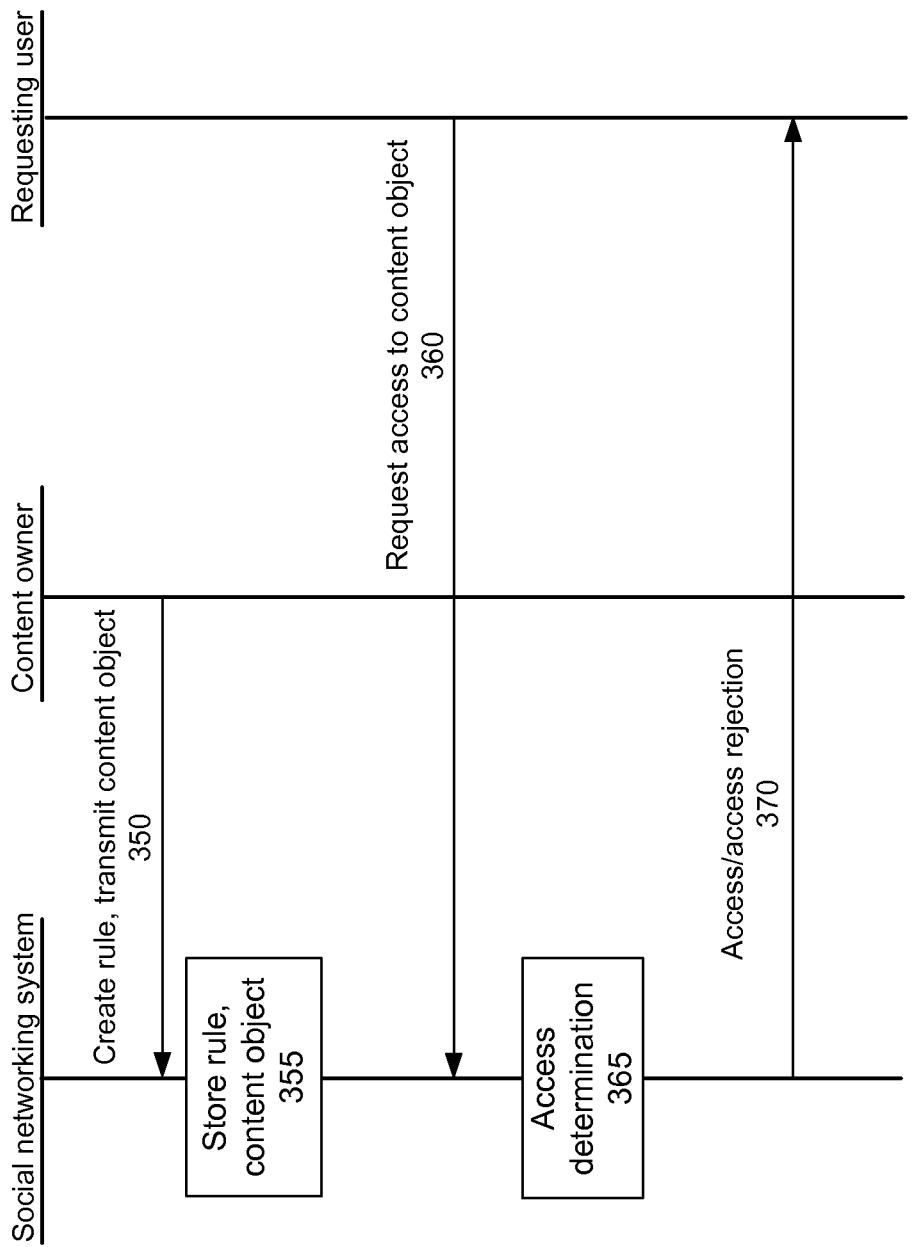
FIG. 3b is an example timing diagram illustrating interactions between a requesting user, a content owner, and a content access management system implemented in a social networking system, according to a second embodiment.

FIGS. 3*a* and 3*b* are example timing diagrams illustrating interactions between a requesting user, a content owner, and a content access management system implemented in a social networking system, according to various embodiments. It should be emphasized that the entities displayed in these embodiments may perform operations other than those illustrated, and that interactions other than those displayed in these embodiments may occur between the entities.

In the embodiment of FIG. 3*a*, a content owner creates 300 an access rule at the social networking system for a content object stored by the content owner. The social networking system stores 305 the created rule and generates a rule ID for the created rule. The rule ID is then sent 310 to the content owner. Subsequent to the creation of the access rule and the receipt of the rule ID by the content owner, a requesting user requests 315 access to the content object from the content owner. In response to receiving the request for access to the content object, the content owner transmits 320 the rule ID associated with the requested content object and the user ID to the social networking system. The social networking system determines 325 whether or not the requesting user may access the requested content object, and transmits 330 this access determination to the content owner. The content owner, in response to receiving the access determination from the social networking system, may grant or deny 335 access to the content object to the requesting user based on the received access determination.

In the embodiment of FIG. 3*b*, in contrast to the embodiment of FIG. 3*a*, the content owner transmits 350 the content object to the social networking system when creating an access rule for the transmitted content object. The social networking system then stores 355 the access rule and the content object. Subsequent to the storage of the access rule and the content object, a requesting user requests 360 access to the content object directly from the social networking system. The social networking system determines 365 whether or not the requesting user may access the requested content object. In response to this determination, the social networking system may grant or deny 370 access to the content object to the requesting user based on this determination.

Figure 4:
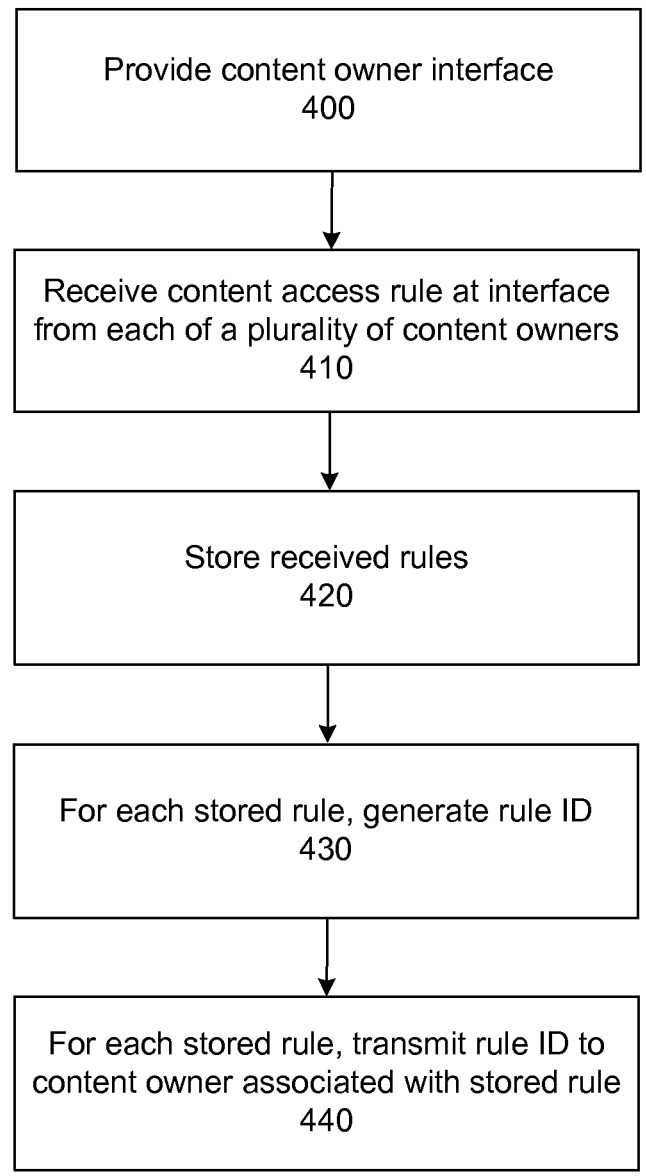
FIG. 4 is a flow chart illustrating a process for receiving content access rules from a plurality of content owners in a content access management system, according to one embodiment.

FIG. 4 is a flow chart illustrating a process for receiving content access rules from a plurality of content owners in a content access management system, according to one embodiment. A content owner interface is provided 400 for content owners to interact with the content access management system. One or more content access rules are received 410 at the content owner interface from each of a plurality of content owners. Each content access is associated with one or more content objects. The received content access rules may include pre-determined access criteria that must be met by a user requesting access to content objects associated with the access rules.

The access rules are stored 420 by the content access management system. A rule ID is generated 430 for each stored access rule, and each rule ID is transmitted 440 to the content owner associated with the access rule (the content owner who created the access rule). The rule ID is an identifier that uniquely identifies the access rule. Transmitting rule IDs to content owners beneficially allows the content owners to subsequently identify the rule to the content access management system.

Figure 5:
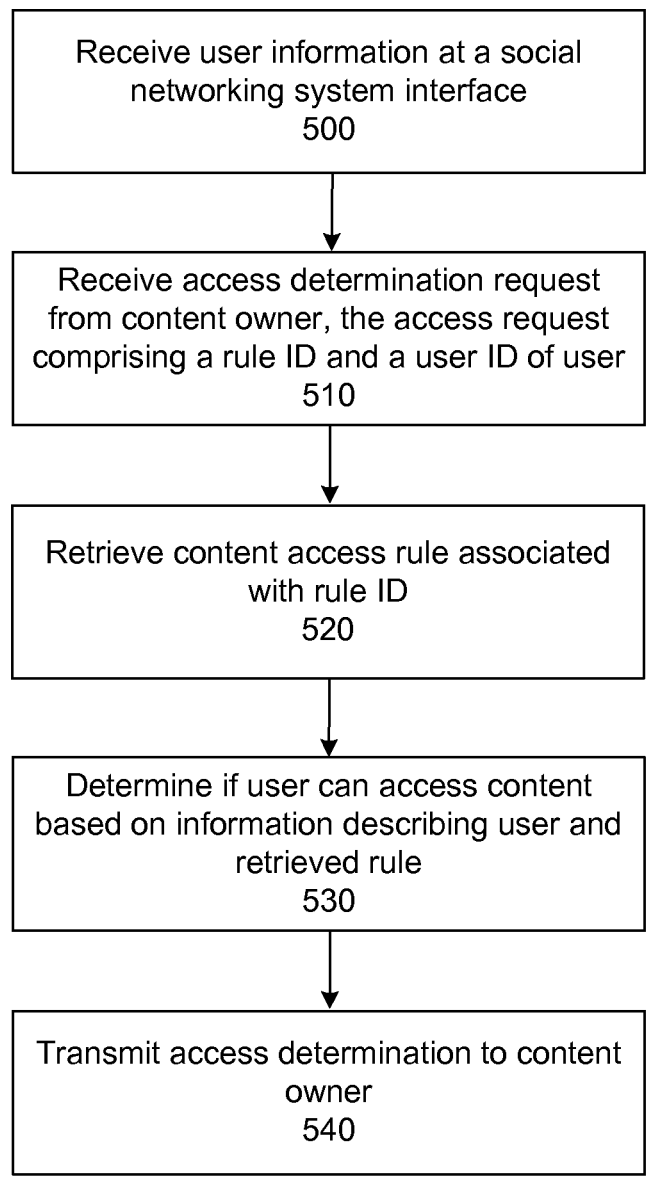
FIG. 5 is a flow chart illustrating a process for determining whether a requesting user can access content based on a rule received from the content owner, according to one embodiment.

FIG. 5 is a flow chart illustrating a process for determining whether a requesting user can access content based on a rule received from the content owner, according to one embodiment. User information is received 500 at a social networking system interface. The user information may be received for purposes unrelated to content access. For example, users may enter biographic or geographic information into the social networking system through the social networking system interface for the purpose of filling out or creating a user profile page. Likewise, a user may take actions within the social networking system unrelated to content access (such as communicating with other users, joining groups, and checking in to locations with a social networking system application) that are tracked by the social networking system.

A request for a content access determination is received 510 from a content owner. The content owner may request an access determination from a content access management system in response to receiving a request to access a content object from a requesting user. The request for a content access determination includes a rule ID and a user ID. The rule ID identifies an access rule associated with the content object requested by the requesting user, and the user ID identifies the requesting user. The content access management system may receive content access rules in advance from content owners, and may generate and transmit a rule ID to the content owners for subsequent access rule identification.

The content access rule associated with the received rule ID is retrieved 520. An access determination is made 530 for the user based on the retrieved rule and information associated with the user. The information associated with the user may be retrieved in response to receiving the user ID, and the retrieved user information may be limited to information required by the retrieved access rule. If the access rule requires particular criteria to be satisfied, and the user information satisfies the criteria, a positive access determination is made; otherwise, a negative access determination is made. The access determination is then transmitted 540 to the content owner. In response to receiving a positive access determination, the content owner may grant the requesting user access to the requested content object. In response to receiving a negative access determination, the content owner may deny the requesting user access to the requested content object, but may provide the requesting user access to alternative content, may prompt the user to enter payment or other information in order to access the requested content object, or may provide information to the requesting user on why the access request was denied.

Figure 6:
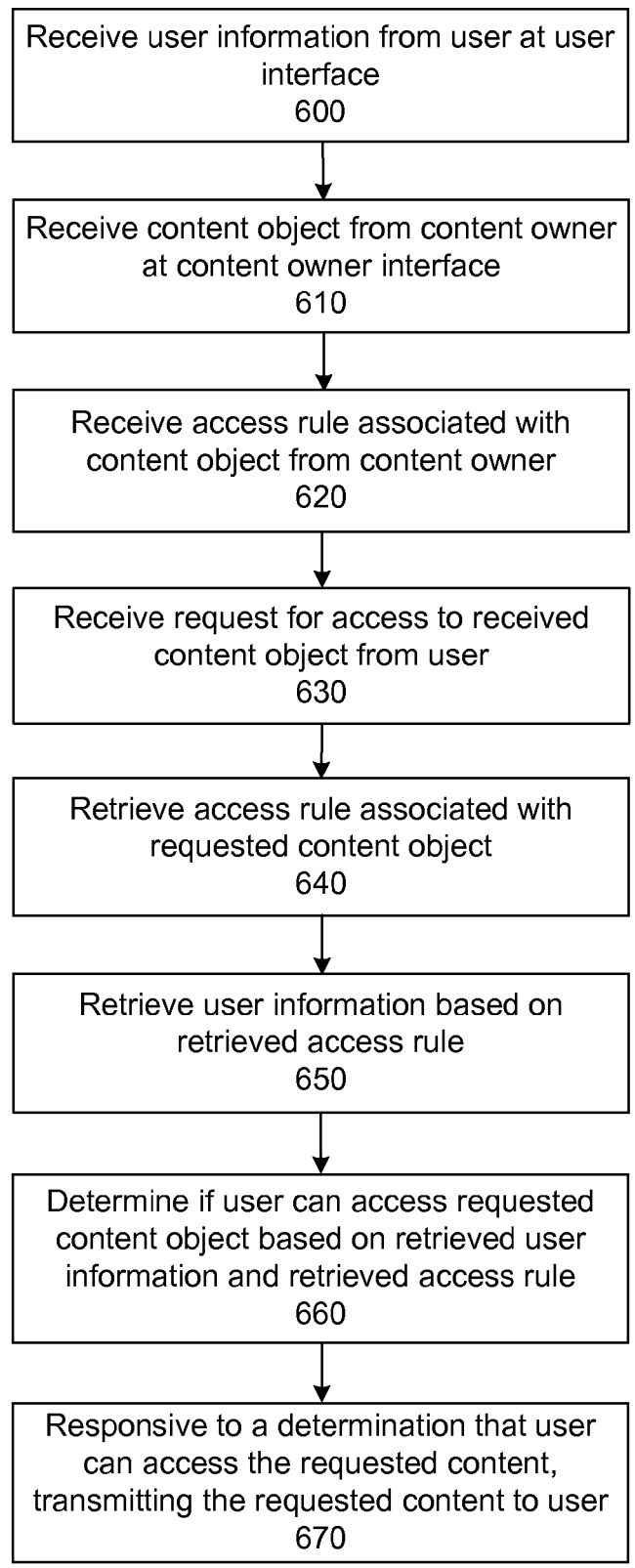
FIG. 6 is a flow chart illustrating a process for determining whether a requesting user can access content based on a rule received from the content owner, according to one embodiment.

FIG. 6 is a flow chart illustrating a process for determining whether a requesting user can access content based on a rule received from the content owner, according to one embodiment. User information is received 600 from a user at a user interface. As discussed above, the received user information may be received for purposes unrelated to the content access, and may instead be received for the purposes of communication, social networking, or any other functionality. A content object is received 610 from a content owner at a content owner interface. The content owner interface may allow content owners to upload content objects, such as images, videos, audio clips, documents, or any other content object. An access rule associated with the received content object is received 620 from the content owner, for instance at the content owner interface. The received access rule may be stored in conjunction with the stored content object.

A request for access to the received content object is received 630 from a requesting user. The access rule associated with the requested content object is retrieved 640. User information associated with the requesting user is retrieved 650 based on the retrieved access rule. For example, if the retrieved access rule requires a requesting user to be older than a minimum age in order to access the requested content object, then age information is retrieved for the requesting user. An access determination is made 660 for the requesting user and the requested content object based on the retrieved user information and the retrieved access rule. Responsive to a determination that the requesting user can access the requested content, the requested content is transmitted 670 to the requesting user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving user information associated with one or more users of a social networking system;
   receiving a content access rule from a content owner server, the content access rule associated with a content object stored at the content owner server and specifying whether a user of the social networking system can access the content object based on one or more items of the received user information;
   responsive to receiving the content access rule, generating a rule identifier uniquely identifying the content access rule;
   transmitting the generated rule identifier to the content owner server;
   receiving an access determination request at a social networking system server from the content owner server in response to the content owner server receiving a request for the content object from a requesting user of the users of the social networking system, the access determination request identifying the requesting user and comprising the rule identifier uniquely identifying the content access rule associated with the requested content object;
   determining, by a processor at the social networking system server, an access determination indicating whether the requesting user can access the requested content object by applying the content access rule identified by the rule identifier to one or more items of the received user information associated with the requesting user; and
   transmitting the access determination from the social networking system server to the content owner server, the content owner server configured to grant the requesting user access to the requested content object responsive to the access determination indicating that the requesting user can access the requested content object.

2. The method of claim 1, wherein the received user information includes one or more of: biographic information, geographic information, entity affiliation information, communication information, and social networking system interaction information.

3. The method of claim 1, wherein the received user information includes information unrelated to the requested content object or the content owner server.

4. The method of claim 1, wherein the received user information includes payment information about a content access fee paid by the requesting user for the content object.

5. The method of claim 1, further comprising:
   providing a content owner interface, the content owner interface configured to allow a content owner of the content owner server to create a content access rule.

6. The method of claim 1, further comprising:
   receiving, at the social networking system server, a content access rule from each of a plurality of content owner servers;
   storing the received content access rules; and
   for each received content access rule:
      generating a rule ID for the content access rule; and
      transmitting the rule ID to the content owner server associated with the content access rule.

7. The method of claim 1, wherein the received content access rule identifies a minimum age that the requesting user must be to access the requested content object.

8. The method of claim 1, wherein the received content access rule restricts access to the requested content object based on an identified one of: a place of employment at which the requesting user is employed, a school at which the requesting user attends, a geographic location at which the requesting user lives, a geographic location at which the requesting user previously lived, a location to which the requesting user has checked in using a mobile device with location detection functionality, and an event at which the requesting user has checked in using a mobile device with location detection functionality.

9. The method of claim 1, wherein the received content access rule identifies at least one of a relationship status, a gender, a philosophy, a political view, and a religious view that must be associated with a profile of the requesting user for the requesting user to access the requested content object.

10. The method of claim 1, wherein the received content access rule identifies one of a favorite movie, a favorite book, a favorite music group, a favorite television show, and a favorite game that must be associated with a profile of the requesting user for the requesting user to access the requested content object.

11. The method of claim 1, wherein the received content access rule restricts access to the requested content object based on an identified one of: a social networking system group to which the requesting user is a member, a social networking system fan page to which the requesting user has subscribed, a social networking system user that the requesting user follows, a social networking system user to which the requesting user is connected, an access criteria that a social networking system user connected to the requesting user must satisfy, and an entity to which the requesting user is connected.

12. The method of claim 1, wherein the received content access rule restricts access to the requested content object based on an identified one of: a social networking system object that the requesting user has shared, a social networking system object that the requesting user has endorsed, a social networking system object that the requesting user has recommended, a social networking system object that the requesting user has tagged, a social networking system event to which the requesting user has RSVP'd, a social networking system game that the requesting user has played, a social networking system game that the requesting user has completed, a social networking system advertisement with which the requesting user has interacted, a social networking system survey that the requesting user has completed, a social networking system question that the requesting user has answered, and a social networking system action that the requesting user has taken.

13. The method of claim 1, wherein the received content access rule identifies an action that originated within a social networking system but that was completed outside the social networking system that the requesting user must have performed for the requesting user to access the requested content object.

14. The method of claim 13, wherein the identified action comprises a purchase made on a website external to the social networking system.

15. The method of claim 1, wherein the received content access rule identifies a content access fee that the requesting user must have paid for the requesting user to access the requested content object.

16. The method of claim 15, wherein the identified fee comprises one of a subscription fee to access a subset of the content owner's content or a one-time fee to access the requested content object.

17. The method of claim 1, wherein the received content access rule identifies a combination of access criteria that must each be satisfied by the received information associated with the requesting user for the requesting user to access the requested content object.

18. The method of claim 1, wherein the content owner server is configured to deny the requesting user access to the requested content object responsive to a determination that the requesting user cannot access the requested content object.

19. The method of claim 18, wherein the content owner server is further configured to indicate to the requesting user the reason for the determination that the requesting user cannot access the requested content object.

20. The method of claim 18, wherein the content owner server is further configured to prompt the requesting user to take additional steps in order to access the requested content object.

21. A method comprising:

receiving an access determination request at a social networking system server from a content owner server in response to the content owner server receiving a request for a content object stored at the content owner server from a requesting user, the access determination request identifying the requesting user and comprising a rule identifier uniquely identifying an access control rule associated with the requested content object, the rule identifier transmitted to the content owner server responsive to the social networking system server receiving the content access rule from the content owner server;

retrieving the content access rule associated with the requested content object using the rule identifier;

retrieving user information associated with the requesting user based on the content access rule;

determining, by a processor at the social networking system server, an access determination indicating whether the requesting user can access the requested content object by applying the retrieved content access rule to the retrieved user information; and transmitting the access determination from the social networking system server to the content owner server, the content owner server configured to grant the requesting user access to the requested content object responsive to the access determination indicating that the requesting user can access the requested content object.

* * * * *